US012177619B2

(12) United States Patent
Vandenberg et al.

(10) Patent No.: US 12,177,619 B2
(45) Date of Patent: Dec. 24, 2024

(54) WEARABLE WATERPROOF AUDIO DEVICE AND SMARTWATCH NECKLACE HEADPHONES

(71) Applicant: SoundSwell, Inc., Encinitas, CA (US)

(72) Inventors: Nicholas Vandenberg, New Hope, PA (US); David White, Los Angeles, CA (US)

(73) Assignee: SOUNDSWELL, INC., Encinitas, CA (US)

( * ) Notice: Subject to any disclaimer, the term of this patent is extended or adjusted under 35 U.S.C. 154(b) by 241 days.

(21) Appl. No.: 17/819,921

(22) Filed: Aug. 15, 2022

(65) Prior Publication Data

US 2022/0400328 A1 Dec. 15, 2022

Related U.S. Application Data

(63) Continuation-in-part of application No. PCT/US2021/018066, filed on Feb. 13, 2021.

(60) Provisional application No. 62/977,129, filed on Feb. 14, 2020.

(51) Int. Cl.
*H04R 1/10* (2006.01)
*H01R 13/52* (2006.01)

(52) U.S. Cl.
CPC ....... *H04R 1/1008* (2013.01); *H01R 13/5202* (2013.01); *H04R 1/1041* (2013.01)

(58) Field of Classification Search
CPC .... H04R 1/1008; H04R 1/1041; H04R 1/105; H04R 1/1091; H04R 1/1016; H04R 1/1058; H04R 5/0335; H01R 13/5202; A63B 33/00; A63B 2208/03; A63B 2209/08; A63B 2225/50; A63B 2225/60;
(Continued)

(56) References Cited

U.S. PATENT DOCUMENTS 4,993,065 A * 2/1991 Chiou .................. H04R 5/0335 379/430
6,707,924 B1 * 3/2004 Okiebisu .................. A45F 5/00 381/384

(Continued)

FOREIGN PATENT DOCUMENTS

WO WO2021163650 4/2021

*Primary Examiner* — Angelica M Mckinney
(74) *Attorney, Agent, or Firm* — Jonathan Kidney; Intelink Law Group, P.C.

(57) ABSTRACT

A waterproof audio earphone device with at least one brace with a curved shape, is configured in a necklace-like manner, with an adjustable securing mechanism coupled to a portion of the brace, to tighten the brace about the prospective user's neck. A smartwatch or music device holder (optionally removable) is disposed in the brace near chest level and a waterproof wireless communication module is coupled to the brace and configured to communicate to a prospective smartwatch/music device disposed in the holder. Audio volume control buttons are disposed on the wireless communication module or the brace or along the earphone wire(s). A pair of earphones are coupled via wires to at least one of the wireless communication module(s) and the brace. And water sealing tips disposed interior of the earphones, the tips preserving the audio quality of the earphones when worn in an aquatic or semi-aquatic setting by a prospective user.

20 Claims, 8 Drawing Sheets

(58) Field of Classification Search
CPC ......... H04B 1/385; H04B 1/3877; A45F 5/00; H04M 1/05
See application file for complete search history.

(56) References Cited

U.S. PATENT DOCUMENTS

| | | | | |
|---|---|---|---|---|
| 7,340,221 | B2 * | 3/2008 | Wikel .................... | H04B 1/385 455/90.3 |
| 8,652,062 | B1 | 2/2014 | Holder | |
| 9,462,369 | B2 * | 10/2016 | Kalhok ................ | H04R 1/1058 |
| 2006/0251283 | A1 | 11/2006 | Yeh | |
| 2007/0021073 | A1 * | 1/2007 | Gratton ................... | H04M 1/05 455/90.2 |
| 2007/0053523 | A1 * | 3/2007 | Iuliis ......................... | A45F 5/00 381/77 |
| 2007/0242424 | A1 | 10/2007 | Lieu et al. | |
| 2008/0047996 | A1 | 2/2008 | Blouin | |
| 2013/0072266 | A1 * | 3/2013 | Shattuck ................ | H04B 1/385 455/569.1 |
| 2015/0280764 | A1 * | 10/2015 | Shattuck .............. | H04B 1/3877 455/557 |

* cited by examiner

WEARABLE WATERPROOF AUDIO DEVICE AND SMARTWATCH NECKLACE HEADPHONES

CROSS-REFERENCE TO RELATED APPLICATION(S)

This application is a 111(a) continuation-in-part filing of International application no. PCT/US2021/018066 filed Feb. 13, 2021 and claims the benefit of the international application and the priority application, U.S. Provisional Patent Application No. 62/9,771,129 filed Feb. 14, 2020, titled "Waterproof Smartwatch Necklace Headphones," the contents of which are hereby incorporated by reference in their entireties.

FIELD

This invention relates to a waterproof headphone apparatus that communicates with a user's smartwatch. More particularly, it relates to a wearable water sport necklace-like apparatus with headphones wired to waterproof Bluetooth® enabled or wireless module(s) communicating wirelessly to an "attached" smartwatch or music device.

BACKGROUND

Water sportsmen would enjoy listening to music during their water activity. However, the music producing device must be waterproof and the means to send the music to the ears must also be waterproof as well as secure enough to not fall out of the ears during the activity. Typical sound means are earphones or earbuds, connected via a hard wire line or via Bluetooth® wireless technology (a registered trademark of the Bluetooth Special Interest Group) to the music producing device. If a wired connection is used, the length of the wires as well as the movement of the wires can interfere with the user's activity. However, Bluetooth® wireless technology is of limited range when underwater and connections can be repeatedly lost if the sending source is underwater.

Therefore, there has been a long-standing need in the sports activity community for a waterproof audio headphone design that does not encumber the user, is easy to use, seals the user's ears from water, as well as avoid the problem of lost connection due to the source being under water. Aspects of a device and method that addresses these and other needs are elucidated below.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

One or more embodiments of the exemplary device is a waterproof audio device which enables users to listen to media from a smartwatch or similar device by wearing the music device as a necklace. This device offers an elegant solution to the signal loss problem found when using wireless headphones connected to a smartwatch worn on the wrist, as the wrist/smartwatch is often immersed in signal-reducing water. The further the Bluetooth® enabled or wireless "receiver" is from the smartwatch, the more likely the signal will be compromised. In the exemplary embodiments, because the smartwatch/music device is secured "around the neck" being in close proximity to the wireless receiver for the headphones, the typical wrist/smartwatch immersion, the loss of signal problem is avoided. Further, the exemplary device's headphones earpieces can be water-sealing so as to be able to perform in multi-sport as well as aquatic or semi-aquatic settings; and thus provides an optimal listening experience. The compact nature of the exemplary device, superior sealing, multi-aquatic sport use, and ease of implementation offer significant advantages over the prior art.

For ease of explanation, the term wireless will be used hereafter to designate any one or more of short-field, near-field, close proximity wireless technology. The foremost example of such "proximity" wireless protocols being Bluetooth® wireless communication. Therefore, in the best mode, Bluetooth® wireless technology can be used, but it is expressly understood that other similar wireless forms of communication can be utilized, without departing from the spirit and scope of this disclosure.

In one aspect of the disclosed embodiments, a waterproof audio earphone device is provided, comprising: at least one brace with a curved shape, configured to be worn in a necklace-like manner around a prospective user's neck; an adjustable securing mechanism coupled to a portion of the brace, configured to tighten the brace about the prospective user's neck; a smartwatch cradle disposed in the brace; a waterproof wireless communication module coupled to the brace and configured to communicate to a prospective smartwatch disposed in the cradle; audio control buttons disposed on the wireless communication module or the brace, a pair of earphones coupled via wires to at least one of the wireless communication module and the brace.

In another aspect of the disclosed embodiments, the above device is described, further comprising, water-sealing tips disposed on an interior side of the earphones, the tips preserving an audio quality of the earphones when worn in water sport activities, wherein the device is suited for water sport activities; and/or wherein the at least one brace are two braces, joined at a bottom portion to form a U-like shape; and/or, wherein the smartwatch cradle is disposed at a bottom of the brace; and/or wherein the wireless communication module is tethered to the brace; and/or wherein the brace is semi-rigid and formed from at least one of nylon, plastic, neoprene, rubber, polyurethane, fluorosilicone, and silicone; and/or the adjustable securing mechanism is comprised of a clasp and a cord connected to the clasp and the brace; and/or wherein the cradle utilizes one of a snap in, magnetic, friction, spring, spring bar, clasp mechanism for securing the prospective smartwatch; and/or further comprising a wireless communication module and power source located in the module or in the brace; and/or wherein the sealing tips are comprised of a plurality of discs of decreasing size; and/or wherein the sealing tips are made from silicone; and/or further comprising a hydrophobic material covering an inner side of the earphones; and/or further comprising a hydrophobic material covering an outer side of the earphones; and/or wherein each earphone wire is less than 10 inches in length; and/or wherein the wireless communication module is less than 6 inches from the smartwatch cradle; and/or further comprising outwardly extending grips attached to the earphones; and/or further comprising loop holes in a top portion of the brace, for coupling a cord to the brace and to a clasp of the adjustable securing mechanism; and/or wherein the power source is rechargeable.

In yet another aspect of the disclosed embodiments, an activity friendly, audio earphone necklace device is provided, comprising: a flexible brace configured for placement over a prospective user's neck; a waterproof wireless communication module physically coupled to a lower portion of the brace; a pair of earphones wired to an upper portion of the wireless communication module; audio control buttons disposed on the earphone wire or on the wireless communication module; at least one releasable strap connected to ends of a bottom of the brace or wireless communication module, the strap bridging opposing sides of the bottom of the brace; securing and releasing mechanisms, connecting ends of the at least one releasable belt to the ends of the bottom of the brace or wireless communication module; and a music player protective case removably attached to the at least one belt, wherein the case is constrained to be less than 10 inches from the wireless communication module, when the case is attached to the strap.

In yet another aspect of the disclosed embodiments, the above device is provided, wherein the case further comprises a rear sleeve that the at least one strap slips through; and/or wherein there are two straps, a left strap and right strap, each strap slipping through one side of the sleeve to connect to a respective left or right side bottom of the brace; and/or wherein the wireless communication module utilizes Bluetooth® communications; and/or wherein the protective case has a zippered opening and is of a size for placement of a smartwatch; and/or, wherein there are two waterproof wireless communication modules, one on each lower side of the brace.

DETAILED DESCRIPTION

Individuals can choose from a variety of existing media players in existence for audio entertainment. However, in an aquatic setting there are far fewer options, and for ocean and water sports athletes, there are practically no options. If one were to use an existing product for these activities, the best candidate would be a waterproof MP3 player. The problem then becomes the necessity of storage as well as the lack of compatibility with modern music streaming applications. Surfers and other sports athletes often lack pockets to secure valuables, and long headphone wires that run from any pockets they do have all the way to their ears would be cumbersome with rigorous movements. Also, joggers or other sports activities do not lend themselves well for a prominent music device bouncing around in the shorts or shirt, with dangling earphone wires.

The exemplary embodiments described herein offer the user the advantages of wearability (if the user has no storage compartments/pockets), removes long, inconvenient wires from the equation, and ensures the security of the device in terms of preventing its potential loss. In some various embodiments, the exemplary device is wearable as a "necklace," with a securing mechanism to ensure the security of the exemplary device on the user through high impacts and other threatening conditions such as ocean currents, waves, and/or sports activities. Additionally, the built-in earphones can be designed for submersible use in water. By sealing the user's ears completely, they deliver clear audio and offer insulation, in turn protecting from ear complications such as infections and "surfer's ear."

Various features are described below, which, in some embodiments can be used independently or in combination with other features from other embodiments. These described embodiments are not to be construed as the only modes or embodiments possible, but are presented here to help explain how some of the inventive features are implemented.

It is expressly understood that the term earphones is sometimes construed in the industry as a larger version of earbuds. However, for the purposes of this disclosure, no distinction is made and the usage of one term may be equivalent to the usage of the other term, noting the earphone or earbud is to be inserted into the ear.

Figure 1:
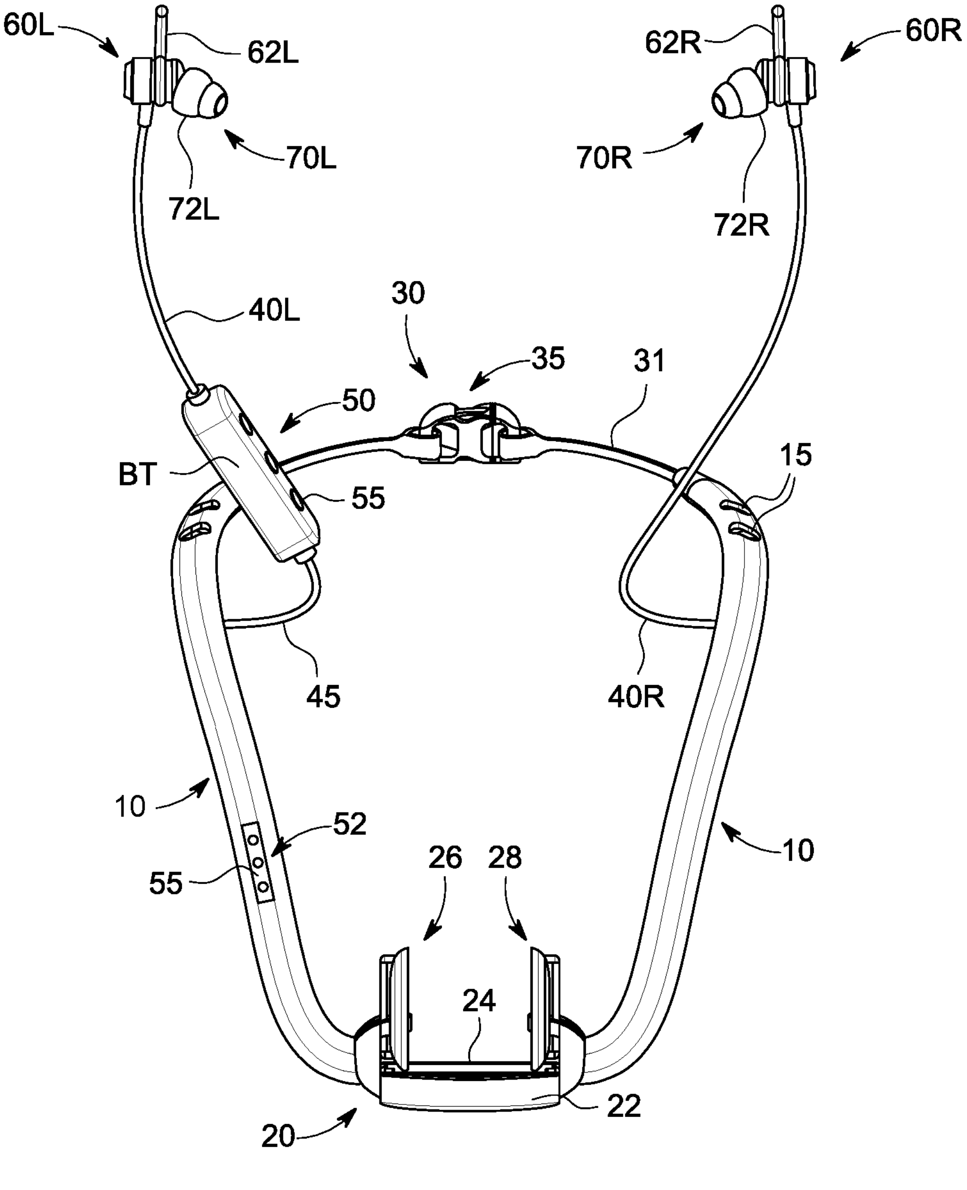
FIG. 1 is a front view illustration of an exemplary embodiment.
Figure 2:
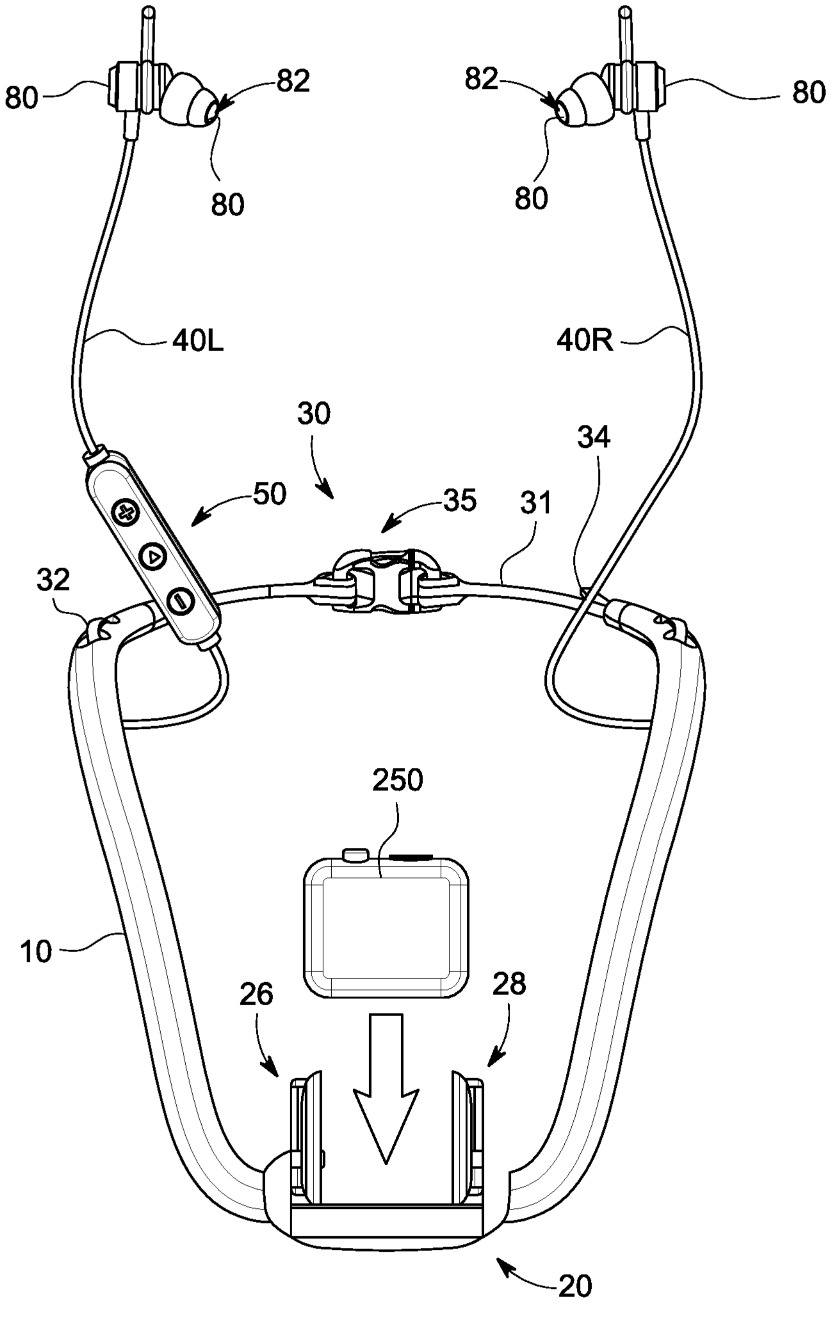
FIG. 2 is a front view illustration of fully configured embodiment with a smartwatch.

FIG. 1 is a front view illustration of an exemplary embodiment and FIG. 2 is a front view illustration of fully configured embodiment with a smartwatch 250 and cord 32 attached to the brace(s) 10. The exemplary device is comprised of one or more "semi-rigid" arc-like brace(s) 10 joined to a smartwatch cradle 20, terminating with a rear securing mechanism 30. In the shown embodiment, this configuration is similar to the shape formed by the letter "U." Extending from the upper portion of the brace(s) 10 are headphone wires 40L/R, a tethered waterproof wireless communication (and audio controlling) module 50 in-line with one of the wires 40L/R, wherein the wires 40L/R lead to earphones 60L/R having ear sealing members 70L/R. The arc-like (or curved) semi-rigid brace(s) 10 can be designed to house various electronics, such as batteries for the tethered wireless communication module 50 or as another option, a non-tethered wireless communication module built into the brace(s) 10, as shown as element 52. In other possible embodiments, the wireless communication module may be located at the cradle 20 portion of the device. It is understood that a version with an integrated wireless communication module requires the brace(s) 10 to be waterproof with respect to regions about the integrated wireless communication module.

It is also understood that the wireless communication module 50 may contain batteries (i.e., power source) inside the module or receive power from batteries located inside the brace(s) 10. With respect to a battery or power source for the wireless communication module 50, it may be a rechargeable source with an appropriate charging connection. For example, in a prototype embodiment, a waterproof USB-C port was placed in the wireless communication module 50. However, it is understood that a port can be placed on other parts of the device, a non-limiting example being near or at the smartwatch cradle 20.

The wireless communication module 50 (or optionally 52) are fitted with audio source control buttons 55, non-limiting examples of which may be forward, reverse, volume up, volume down, and so forth. Pushing various combinations of buttons 55 at the same time or for a predetermined duration or sequence may reduce the need for individual buttons for each action. The wireless communication module 50 (or optionally 52) communicate to a device-mounted smartwatch 250 via wireless technology and converts the wireless signal to a wired signal, which is transmitted up to the earphones 60L/R via wires 40L/R. (Signal for wire 40R can be fed through the bottom wire 45 of wireless communication module 50 through the brace(s) 10 to exit out the right side to wire 40R). By physical connection of the wires 401/R to the earphones 60L/R, loss of the earphones 60L/R can be avoided. The choice of left or right for the location of the wireless communication module 50 (or optionally 52) is a design choice. The close proximity of the wireless communication module 50 to the smartwatch 250 (less than 6 inches in many cases) avoids the typical signal loss problem from the smartwatch 250 and the short length of the wires 40L/R (less than 10 inches in many cases) to wireless communication module 50 avoids the typical tangling problem. It is expressly noted that the earphones 60L/R are not wireless.

The semi-rigidity of the brace(s) 10 can be achieved using an elastomeric material (similar to an Apple® Watch sports band—Apple is a registered trademark of the Apple Corporation) in a molding, casting, etc. process. Any number of different kinds of materials can have semi-rigid properties, non-limiting examples, being nylon, plastic, rubber, neoprene, fluorosilicone, silicone, combinations thereof, and so forth. Also, the semi-rigid curved brace(s) 10 could be replaced with a form factor that is smaller or larger than shown, or be in segmented portions, according to design preference.

In a prototype embodiment, the dimensions of the device were tailored for the average adult user, roughly 6" in width (left to right), 5" in height (top to bottom), and 5" in depth (front to back). As these are approximate dimensions, larger or smaller sizes can be implemented. It is noted the general concept is to provide a device that can be worn closely around the neck in a necklace-like apparatus, thus providing close proximity to the ears, minimal movement and easy to operate, without interfering with arm or hand movement.

The top portion of the brace(s) 10 is shown here as joined with an adjustable rear securing mechanism 30, which can be a clasp or latch 35 in combination to one or more cord(s) 31 connected to the brace(s) 10 via the one or more loop holes 15. The cord(s) 31 may be of elastic material, paracord, etc. or may be in the form of a strap, if so desired. The cord(s) 31 may be adjusted to be tightened or loosened for user comfort via the clasp 35 or through the loop holes 15. For example, tightening may be achieved by pulling the cord(s) 31 through one or more of the loop holes 15, as seen in FIG. 2's element 32 and tail of the cord 34. Or, the clasp 35 may be replaced with a pulley clasp. It is understood that the rear securing mechanism 30 shown is a simple design, therefore more complicated designs or different types of securing mechanisms or different locations can be incorporated by one of ordinary skill in the art, without departing from the spirit and scope of this disclosure.

Smartwatch cradle 20 is located at the "front" and lower end of the device and contains a mechanism (one or more of 22, 24, 26, 28) to secure the smartwatch 250 to the device. As the type as well as size of the smartwatch to be secured is manufacturer-dependent, the cradling or securing mechanism will be appropriately matched. The type of attachment means possible is varied in the industry, however, snap-in, magnetic, friction, spring, clasps, etc. structure for securing the smartwatch can be used according to knowledge of one of ordinary skill in the art. In a prototype embodiment, spring bars were used to secure the smartwatch to the cradle 20. Additionally, the adapters for different sized watches can be implemented.

For illustrative purposes, the embodiment described is shown as having lateral mounted cradling mechanisms 26, 28, and forward and aft sleeves 22, 24, respectively, but as stated above, any suitable design can be utilized. In a prototype embodiment, the sleeves 22, 24 were configured to support a standard size Apple® smartwatch and were joined at their bottoms to provide protection to the smartwatch from impact. Of course, the bottom joining is a design option. Cradling mechanisms 26, 28 were similarly configured for a standard size Apple® smartwatch in the prototype embodiment and may be taller or shorter than shown. Moreover, the cradle 20 can be centered as shown or off-centered, elevated on one side, etc. and etc.

The headphone wires 40L/R are wired integrally to the brace(s) 10 and protrude from an upper portion of the brace(s) 10 on a user's neckline below his or her ears. The wiring 40L/R attaches to earphones 60L/R which contain speakers for audio output.

The earphones 60L/R can include water sealing tips 70L/R which utilize one or more discs 72L/R of silicone or equivalent (in a prototype, 3 discs were used) of decreasing size to help seal the user's ears and prevent water from entering the ear canal. The outer side of each earphone 60L/R may be covered with an optional hydrophobic mesh 80 to allow ambient noise to enter while stopping water entry into the speaker. In a prototype embodiment, the outer side of the earphones were sealed. The speaker holes 82 in the earphones 60L/R can be covered with a hydrophobic mesh 80 to ensure that water cannot enter from the ear-side of the earphones. At the upper region of the earphones 60L/R are optional earphone handles or grips 62L/R that allow a user to easier-grip the earphones 60L/R. The grips 62L/R allow the earphones 60L/R to be secured into a user's ear when twisted in the appropriate direction (for example, clockwise for left ear, counter-clockwise for right ear).

An alternative embodiment, not shown, could be constructed with the curved brace(s) being replaced with lace, paracord, or nylon for the necklace functionality. This would require the integral headphones to be attached to the electronics housing.

Figure 3:
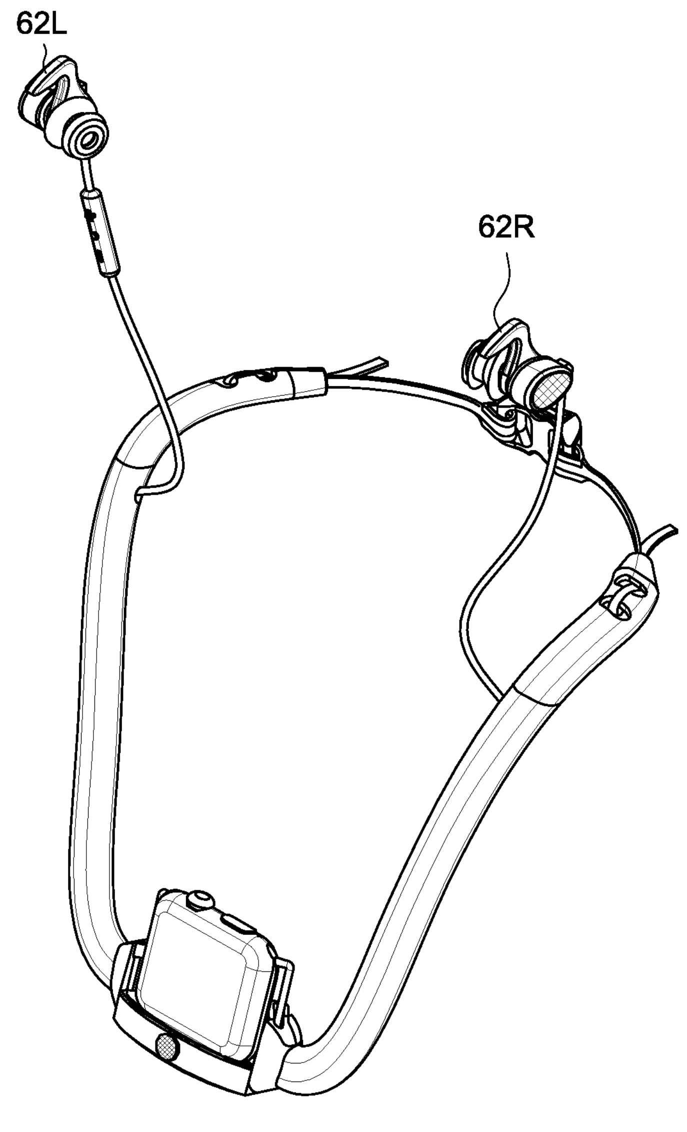
FIG. 3 provides a better illustration of the hook-like shape of the grips.

FIG. 3 provides a better illustration of the hook-like shape of the grips 62L/R and is understood to be self-explanatory.

Figure 4:
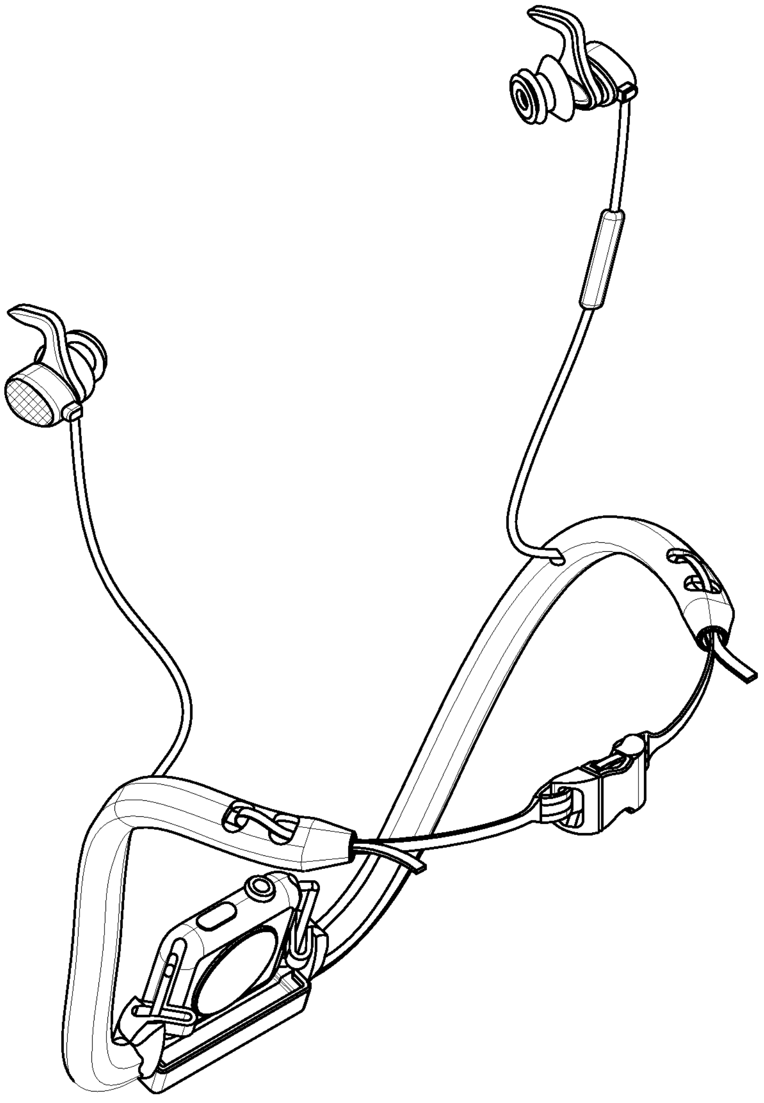
FIG. 4 provides a rear perspective view of an exemplary embodiment with an attached smartwatch.

FIG. 4 provides a rear perspective view of an exemplary embodiment with an attached smartwatch 250 and is understood to be self-explanatory.

Figure 5:
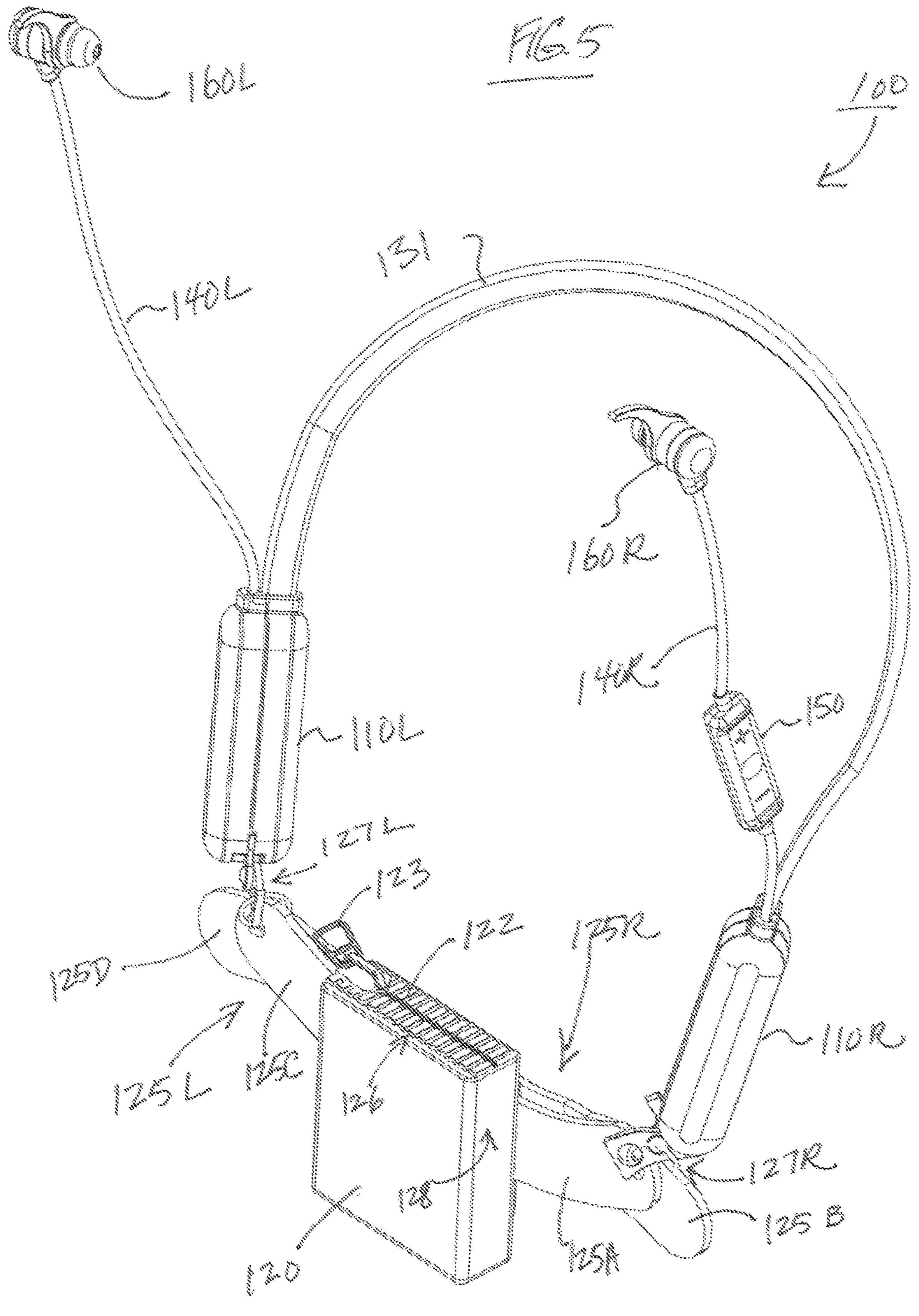
FIG. 5 is a perspective front view of an alternate embodiment having similar functional elements of the prior embodiment but in a modified form.

FIG. 5 is a perspective front view of an alternate embodiment 100 having similar functional elements of the prior embodiment but in a modified form. The primary differences are evident with removal of rear securing mechanism 30 and latch 35 (See FIG. 1) and the addition of a removable smartwatch case 120. Here, the case 120 provides a protective covering for a smartwatch (not shown) while also securing the smartwatch to the main hardware of embodiment 100. By use of a case 120, the need for cradling mechanisms to attach a smartwatch can be avoided, and the exemplary device can be used with any smartwatch or device that can fit within the case 120.

Case 120 has one or more zippering mechanisms as shown (e.g., teeth 122 and slider 123) at its top 126, but it may be any type of controllable opening. Of course, in some embodiments, one or more sides 128 of the case 120 may be used to provide the desired opening, or the opening may include the top 126 and part of the sides 128 of the case 120, as well as any other sides, ends, or faces, etc. The case 120 is understood to be sized large enough to fit a typical smartwatch or other equivalent wireless music player. Also, while the case 120 is shown here as a box-like shaped enclosure, it may be of any shape desired. It is understood that case 120 can be designed to provide impact and waterproof protection, if so desired. The makeup of the case 120 can be of any material, such as neoprene, soft plastic, nylon, cloth, rubber, etc. Additionally, the "opening" afforded in the case 120 does not necessarily have to be zipper based, and may be any conventional "closable" opening mechanism, non-limiting examples being flap, belt, zip-lock, and so forth.

Case 120 can be permanently or removably attached to a strap or "belt," shown here as two belts, left and right belts 125L/R, wherein ends 125A, 125B for right belt 125R and ends 125C, 125D for left belt 125L are shown. One or more of the belt's ends 125A, B, C, D are removably connected via releasing connectors 127L, 127R to a bottom of the brace 131, shown here containing one or more wireless communication technology containing sections 110L and 110R, which either individually or separately contain similar communication hardware and power source, as discussed in the prior FIGS. It is understood the wireless communication technology containing sections 110L and 110R are designed to be slender in form, adding only slightly to the diameter of the brace 131, so as to have an unobtrusive form factor. In some embodiments, the brace 131 may be thicker than the wireless communication technology containing sections 110L and 110R, depending on design and comfort considerations.

Depending on implementation preference, one or both sections 110L/R may contain all the necessary wireless communication (or Bluetooth® capabilities) hardware, while the other section may be simply for aesthetics or comfort. Requisite user interface 150 is attached to one of the wires 140R (or 140L) to provide volume, track, etc. control. In some embodiments, only the user interface 150 side may have the wireless communication section (e.g., 110R) with no "matching" other section. Terminating each wire 140R/L are earphones 160L/R. An arc-like neck-covering brace 131 is coupled to the tops of sections 110L/R. Brace 131 may be thick as shown or be simply a cord. Size, type, material type, length of the brace 131 is a design choice. In some embodiments, brace 131 may possess a releasable opening, analogous to the earlier embodiment, as well as have multiple thicknesses along its length, if so desired.

In contrast to the embodiment of FIG. 1 where tightening was performed at the "top" of the device, tightening of this embodiment 100 is accomplished at the "bottom" of the device. This is achieved via the belts 125L/R, as further seen in the following FIG. The exemplary device can be sized to have its bottom near the user's chest (upper, lower, mid—a design or user size consideration), keeping the device relatively away from arm movement areas of the user. Thus, the user can perform activities with the exemplary device without undue interference.

Figure 6:
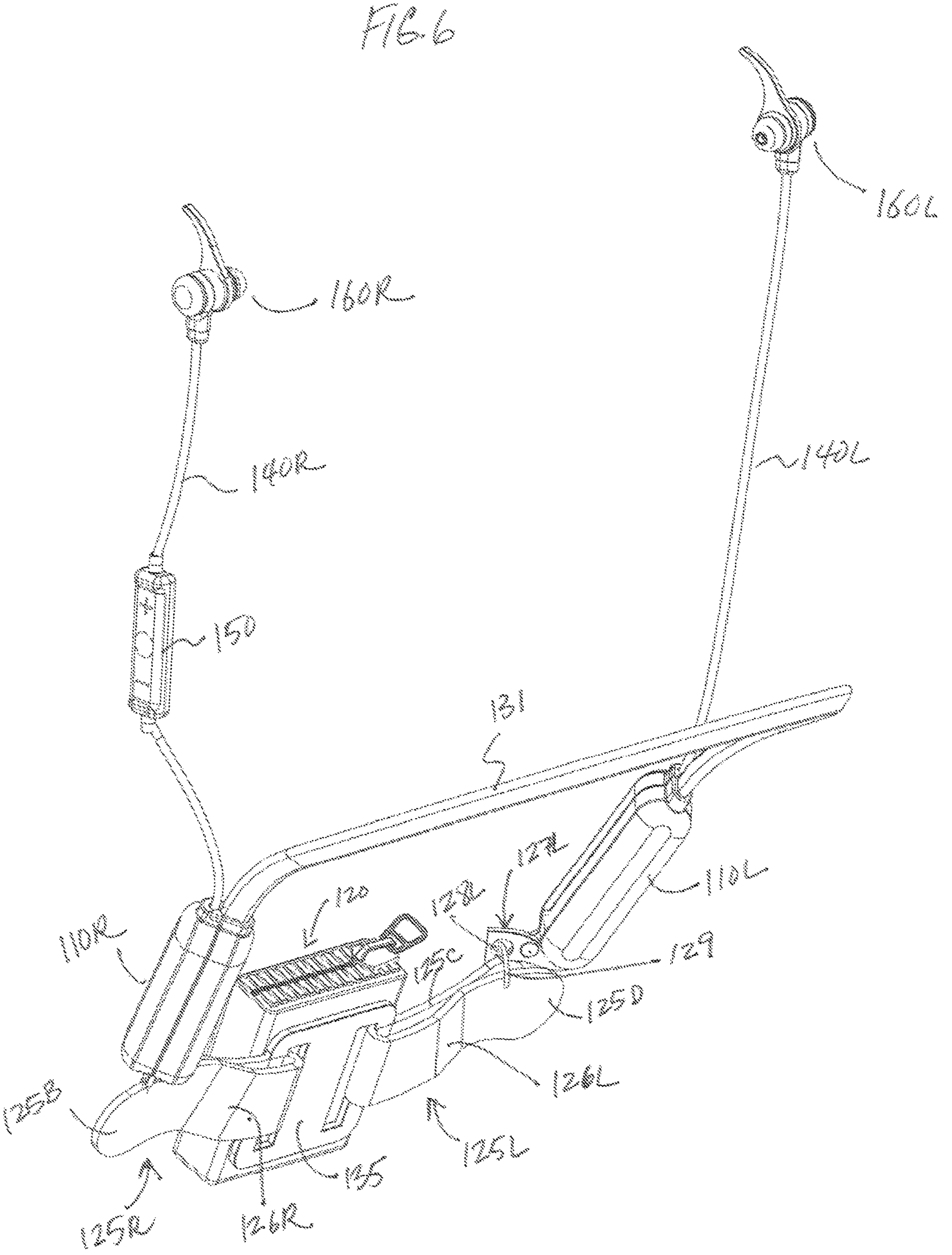
FIG. 6 is a rear view of the embodiment shown in FIG. 5.

FIG. 6 is a rear view of the embodiment 100 shown in FIG. 5. Rear of the case 120 is fitted with a "sleeve" 135 or buckle which is attached to the case 120, that allows belts 125L/R to be inserted therein and then looped to provide "attachment" of the case 120 to ends of one or more wireless communication sections 110L and 110R or to the bottom of the brace 131. In this example, one end of each of the belts 125L/R is attached to releasing connectors 127L/R. The releasing connectors 127L/R are either releasable from the belt-side and/or from the wireless communication section sides. Thus, a user can "clip" or "unclip" one or both sides of belts 125L/R to or from the respective wireless communication section sides, via releasing connectors 127L/R. In this FIG, only the clipping arrangement for the left side is fully viewable, showing ring 129L inserted in belt end 125C and also inserted into a hole 128L at a bottom of the releasing connector 127L. If the ring 129L is "solid," then releasability is only via the releasing connector 127L to wireless communication section end 110L. If the ring 129L is not-solid (meaning, it can be bypassed), then releasability can be via the releasing connector 127L and the belt end 125C. In some embodiments, the ring 129L may be substituted with another type of connector between the belt ends and releasing connectors.

Analogous connections on the other side (R) are understood, though being obscured from view in FIG. 6. Tightening can be accomplished by threading the loose end of the belts (125R/L) through friction sleeves or loops 126R/L, respectively and pulling to achieve the desired tightness. It is understood that tightening a belt or cord can be accomplished in innumerable ways and securing the tightened belt or cord can similarly be done via innumerable ways. Therefore, other methods or means for accomplishing this are understood to be within the purview of this disclosure. Non-limiting examples are buckles, hook-loop fasteners, clips, knurls, elastic, pulley, hooks, and so forth. This approach is similar to tightening of straps, watchbands, cords, etc., and therefore, further elaboration is not needed.

Releasable connectors 127L/R, as further illustrated below, can be any device that provides releasable connection, but in a commercial embodiment is tension controlled pinchers or arms that close over a bar (obscured from view) disposed at an end the wireless communication sections 110L/R. By pushing on ends of the releasable connectors 127L/R, the pinchers can open to release from whatever it is attached to. Thus, case 120 can be removed from the device by either of two ways: operation of the releasable connectors 127L/R to "unclip" the belt-case combination from the wireless communication sections 110L/R or by untying the belts 125L/R from the case's sleeve 135.

Figure 7:
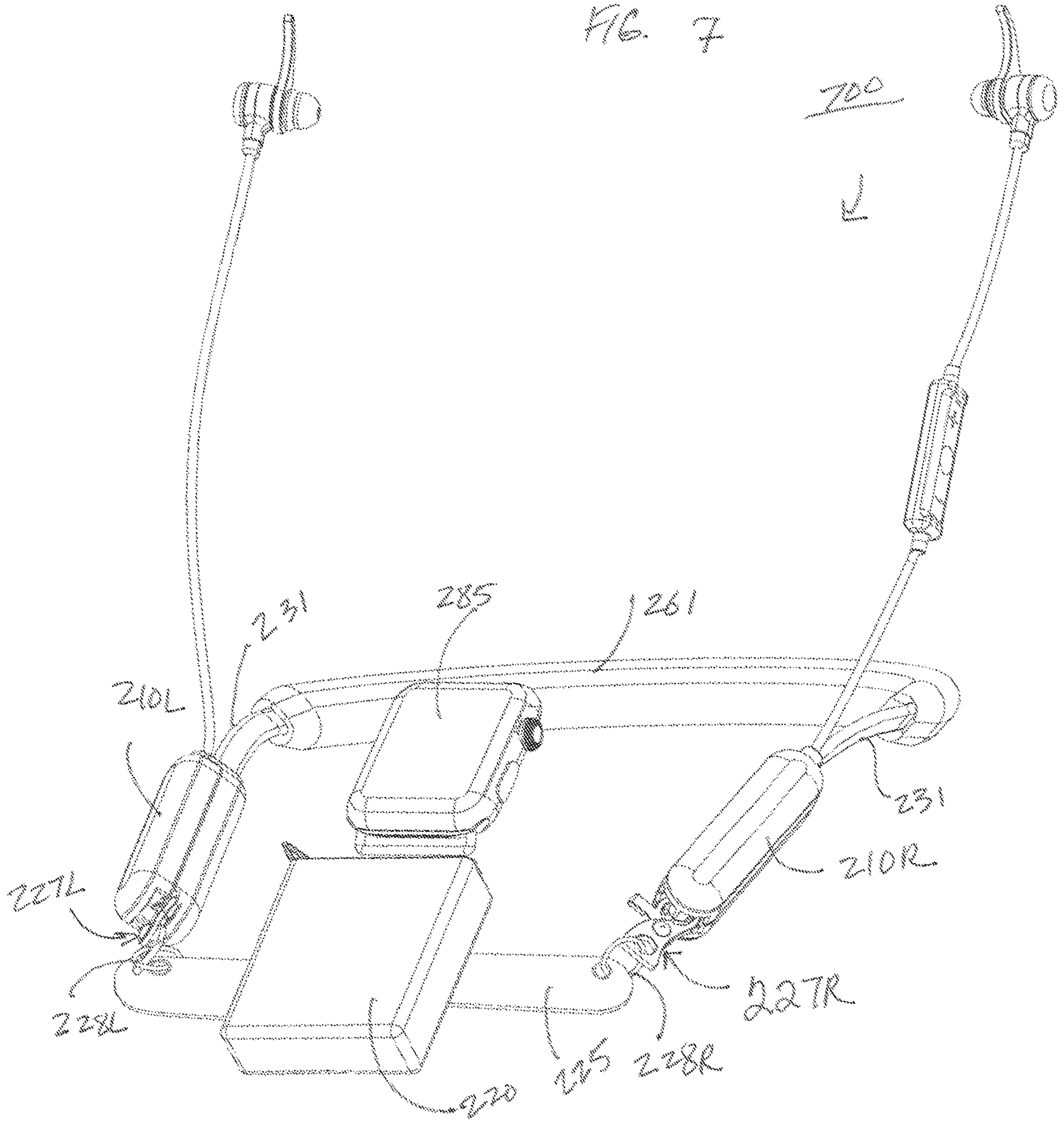
FIG. 7 is another similar embodiment also showing a smartwatch for insertion into the case.
Figure 8:
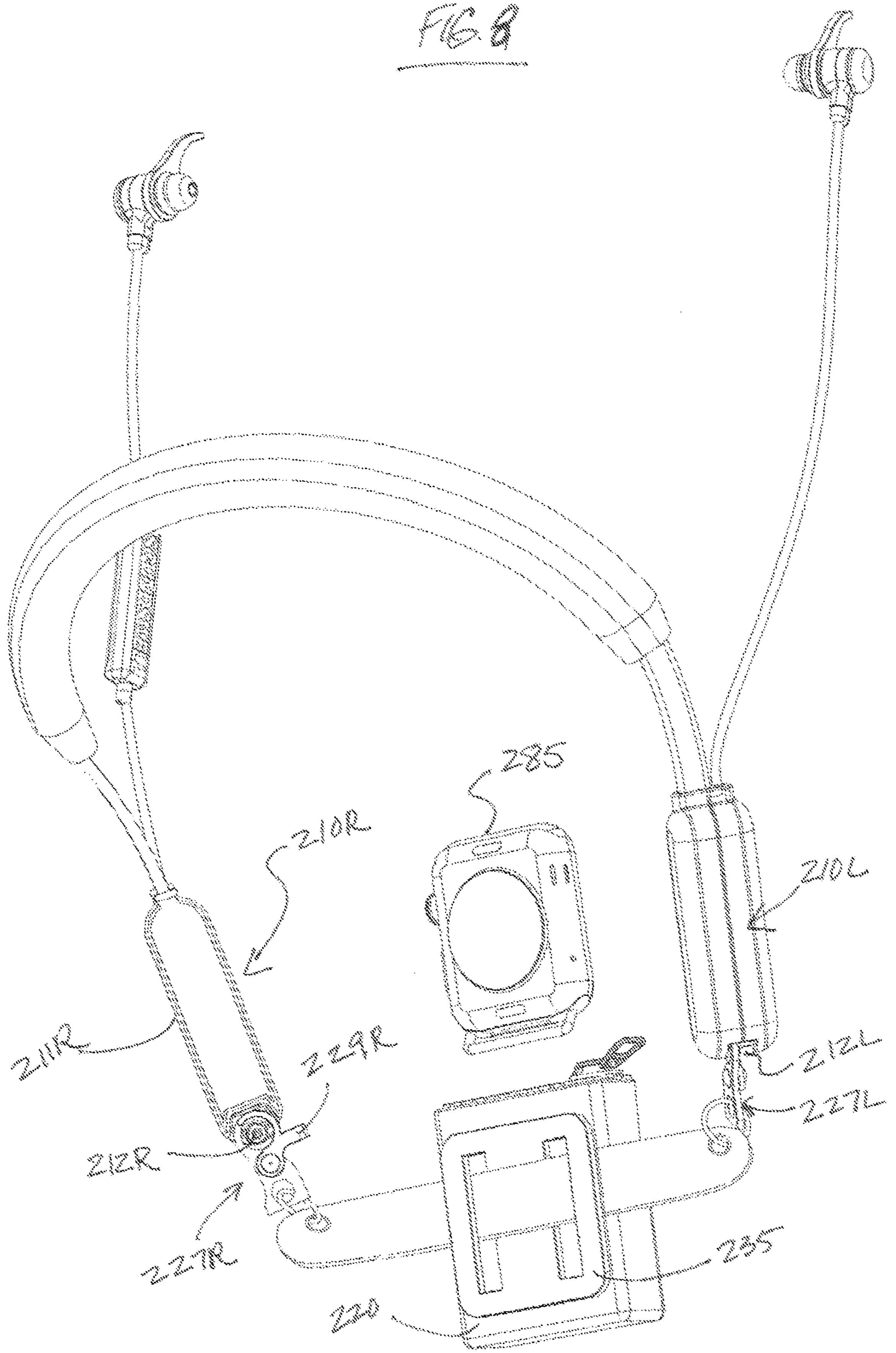
FIG. 8 is a rear view of the embodiment of FIG. 7, with a partial cut-away view of a wireless communication section.

FIG. 7 is another similar embodiment 700 also showing a smartwatch 285 for insertion into case 220. This embodiment 700 is slightly different from the previous embodiment, in that a single, non-adjustable belt 225 is used, presuming a one-size fits all design. In other embodiments, for an adjustable design, the upper loop 261 in combination with side arms 231 can be adjusted to provide "tightening" of the device around a user's neck. In some embodiments, side arms 231 may slide into/out of upper loop 261 or side arms 231 may slide into/out of openings (not shown) in wireless communication sections 210L/R, to achieve the desired "tightness." This particular FIG. shows a clearer view of the releasable connectors 227L/R and their associated rings 228L/R coupling the releasable connectors 227L/R to belt 225. While this FIG. shows a clasp type connector 227L/R, any type of connector may be used, non-limiting examples being spring-connectors, paperclip-like connector, carabiners, hooks, and so forth FIG. 8 is a rear view of the embodiment of FIG. 7, showing smartwatch 285, case 220, "sleeve" 235, and a partial cut-away view of wireless communication section 210R for a better understanding of the physical connection made by the releasable connectors 227L/R. The left side of FIG. 8 shows a cut-away of wireless communication section 210R's housing outline 211R and which has a bar 212R that releasable connector 227R "clips" onto via operation a spring tensioned shoulder 229R. Right side of FIG. 8 shows the other wireless communication section 210L's housing bar 212L with releasable connector 227L coupled to it. As can be seen, sleeve 235 is of fixed length.

The above embodiments enable the smartwatch to be housed within the case wherein the case is detachable from the device. Therefore, with this "removability" option, a user can place the case (with "smartwatch") in his/her pocket and still be able to use the headphones of the exemplary device when the problem of water interference is not present. Moreover, the exemplary device can be used without the case, noting the mechanism for communication is device-independent and therefore, can be used with a smartphone or other wireless communication technology capable device. This flexibility enables the exemplary device to be used for other activities that are not primarily water-related as well as when the case or pouch is removed. If the case is removed, the bottoms of the embodiments of FIGS. 5-8 can be "clipped" together, or clipped to a piece of clothing to prevent potential loss of the exemplary device in a high activity event.

In view of the above, in some embodiments, a lanyard can be attached to the case, to facilitate securing to the user's clothing or other object. In some embodiments, the earphones can be clipped together or the modules can be clipped together and used with a waterproof case and lanyard to overcome the wireless range limitation in water. This embodiment would be optimal for users who do not own a smartwatch. It should be understood also that while the exemplary embodiments show earphones that are shaped for insertion into the ear, other types of earphones such as around-the-ear or ear-bone conduction types may be utilized.

The present disclosure is not to be limited in terms of the particular embodiments described in this application, which are intended as illustrations of various aspects and is not intended to be limiting. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A waterproof audio earphone device, comprising:
- at least one brace with a curved shape, configured to be worn in a necklace-like manner over a prospective user's neck;
- an adjustable securing mechanism coupled to a portion of the brace, configured to tighten the brace about the prospective user's neck or chest;
- a holder disposed in the brace, configured in size to hold a compact wireless music player or smartwatch;
- a waterproof wireless communication module physically coupled to the brace and configured to communicate to the compact wireless music player or smartwatch disposed in the holder;
- audio control buttons disposed on the waterproof wireless communication module or the brace; and
- a pair of earphones coupled via wires to at least one of the waterproof wireless communication modules and the brace.

2. The device of claim 1, further comprising, water-sealing tips disposed on an interior side of the earphones, the tips preserving an audio quality of the earphones when worn in water sport activities.

3. The device of claim 2, wherein the sealing tips are comprised of at least one of a plurality of discs of decreasing size and made from silicone.

4. The device of claim 1, wherein the at least one brace is two braces, joined at a bottom portion to form a U-shape.

5. The device of claim 1, wherein the holder is disposed at a bottom of the brace.

6. The device of claim 1, wherein the waterproof wireless communication module is tethered to or integral to the brace.

7. The device of claim 1, wherein the brace is semi-rigid and formed from at least one of nylon, plastic, rubber, neoprene, fluorosilicone, and silicone.

8. The device of claim 1, wherein the adjustable securing mechanism is comprised of a clasp and a cord connected to the clasp and the brace.

9. The device of claim 1, wherein the holder utilizes one of a snap in, magnetic, friction, spring, spring bar, clasp mechanism for securing the compact wireless music player or smartwatch device.

10. The device of claim 1, further comprising a power source located in the module or in the brace.

11. The device of claim 1, further comprising a hydrophobic material covering at least one of an inner side of the earphones and an outer side of the earphones.

12. The device of claim 1, wherein each earphone wire is less than 10 inches in length.

13. The device of claim 1, wherein the waterproof wireless communication module is less than 6 inches from the holder.

14. The device of claim 1, further comprising outwardly extending grips attached to the earphones.

15. A fitness wearable, audio earphone necklace device, comprising:
- a flexible brace configured for placement over a prospective user's neck;
- a waterproof wireless communication module physically coupled to a lower portion of the brace;
- a pair of earphones wired to the waterproof wireless communication module;
- audio control buttons disposed on the earphone wire or on the waterproof wireless communication module;
- at least one releasable strap connected to ends of a bottom of the brace or waterproof wireless communication module, the at least one releasable strap bridging opposing sides of the bottom of the brace;
- securing and releasing mechanisms, connecting ends of the at least one releasable belt strap to the ends of the bottom of the brace or waterproof wireless communication module; and
- a music player protective case removably attached to the at least one releasable belt strap, wherein the music player protective case is constrained to be less than 10 inches from the waterproof wireless communication module, when the music player protective case is attached to the at least one releasable strap.

16. The device of claim 15, wherein the music player protective case further comprises a rear sleeve that the at least one releasable strap slips through.

17. The device of claim 16, wherein the at least one releasable strap is two straps, a left strap and right strap, each strap slipping through one side of the sleeve to connect to a respective left or right side bottom of the brace.

18. The device of claim 15, wherein the waterproof wireless communication module utilizes Bluetooth communications.

19. The device of claim 15, wherein the music player protective case has a zippered opening and is of a size for placement of a smartwatch.

20. The device of claim 15, wherein there are two waterproof wireless communication modules, one on each lower side of the brace.

* * * * *